(12) United States Patent
Savagian et al.

(10) Patent No.: US 8,178,190 B2
(45) Date of Patent: May 15, 2012

(54) FLOOR MARKING TAPE

(75) Inventors: Michael D. Savagian, Germantown, WI (US); Steven H. Mess, Franklin, WI (US); Matthew C. Cole, Kenosha, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 99 days.

(21) Appl. No.: 12/620,297

(22) Filed: Nov. 17, 2009

(65) Prior Publication Data

US 2011/0117336 A1 May 19, 2011

(51) Int. Cl.
*B32B 3/00* (2006.01)
(52) U.S. Cl. ...................... 428/203; 428/195.1
(58) Field of Classification Search .............. 428/203
See application file for complete search history.

(56) References Cited

U.S. PATENT DOCUMENTS

| | | | |
|---|---|---|---|
| 5,858,495 A * | 1/1999 | Eikmeier et al. | 428/40.1 |
| 2003/0072906 A1 * | 4/2003 | Wenninger et al. | 428/40.1 |
| 2005/0069697 A1 | 3/2005 | Goecke | |
| 2007/0044397 A1 * | 3/2007 | Wiercinski et al. | 52/177 |
| 2008/0182077 A1 * | 7/2008 | Lowe | 428/189 |
| 2010/0055435 A1 * | 3/2010 | Neubert et al. | 428/220 |

FOREIGN PATENT DOCUMENTS

| | | | |
|---|---|---|---|
| DE | 102006057800 | * | 6/2008 |
| WO | 01/76867 A2 | | 10/2001 |
| WO | 2004/106054 A1 | | 12/2004 |
| WO | 2006/116040 A1 | | 11/2006 |
| WO | 2007/117952 A1 | | 10/2007 |

* cited by examiner

*Primary Examiner* — Mark Ruthkosky
*Assistant Examiner* — Ian Rummel
(74) *Attorney, Agent, or Firm* — Whyte Hirschboeck Dudek SC

(57) ABSTRACT

A floor marking tape has a total thickness of 5-7 mil (0.127-0.178 mm) and consists of:

A. A top layer consisting of a translucent polyester backing film free of plasticizer and having (i) top and bottom facial surfaces, (ii) a thickness of 3-5 mil (0.076-0.127 mm), (iii) a Shore A Hardness of at least 90, and (iv) a modulus of elasticity of at least 200,000 psi;

B. A middle layer consisting of a graphic image having top and bottom facial surfaces the top facial surface of which is in direct contact with the bottom facial surface of the polyester backing film; and C. A bottom layer consisting of a pressure sensitive adhesive (PSA) having top and bottom facial surfaces the top surface of which is in direct contact with at least one of the bottom facial surface of the backing film and graphic image, the PSA having a (i) thickness of 2-3 mil (0.051-0.076 mm), and (ii) shear resistance of at least 50 hours as measured by PSTC 7 with a one-half inch by one inch sample area.

8 Claims, 3 Drawing Sheets

FLOOR MARKING TAPE

CROSS-REFERENCE TO RELATED APPLICATIONS

None

STATEMENT REGARDING FEDERALLY SPONSORED RESEARCH OR DEVELOPMENT

None

FIELD OF THE INVENTION

This invention relates to floor marking tapes. In one aspect the invention relates to floor marking tapes comprising a translucent top layer over-laid on an adhesive layer while in another aspect, the invention relates to floor marking tapes in which the underside of the top layer is printed.

BACKGROUND OF THE INVENTION

Durable floor marking tapes that will withstand heavy traffic under industrial conditions are desired for use in factories. Heavy traffic means subject to forklift wheels going straight, turning or pivoting, cleaning scrubbers, skids being dragged, hand carts, pallet jacks, metal shavings or debris embedded into wheels, and frequent foot traffic. The tape should be easy to install in straight lines, repositionable yet build sufficiently high adhesion. It should be removable without leaving adhesive residue that cannot be easily cleaned. Typically, it is only for indoor use and available in multiple colors and capable being printed with various graphics such as diagonal stripes. Occasionally it is used in discontinuous shapes (e.g., corner L's, T's, dots, dashes, etc.) and sometimes floor signs are made from it.

Current products on the market fall within two categories. One product category comprises a thinner (typically less than 0.008" thick), inexpensive, polyvinyl chloride (PVC) backed, self-adhesive tape. It may be self-wound (i.e., linerless) or it may be carried on a liner. This category of tape is generally stretchy, and it is usually pigmented within the PVC film backing for an overall color. It can also carry additional graphics that are surface-printed, such as diagonal stripes. The PVC backing typically contains a plasticizer which results in a conformable, somewhat stretchy tape.

The other category is a much thicker backed tape or extrusion. These are also made from plasticized PVC and can range from 0.020" to 0.080" thick. While they may be slit from sheets, typically tape products in this range are extruded at their finished width. Finished widths for tapes of both categories range from 2" to 4". The thicker category is usually extruded with a beveled edge profile to ease sliding or rolling traffic across its width.

The thinner tapes, being stretchy, are oftentimes quite difficult to apply in straight lines. In addition, to accommodate stretch that results from unwinding and laying the tape out, compensation is needed to allow recovery and avoid shrinkage and distortion after application.

Plasticizer compatibility with pressure-sensitive adhesives (PSA, the adhesive of choice for floor marking tapes) is also a problem with tapes having a PVC backing. Plasticizers tend to migrate out of the PVC backing and in to the PSA and if compatible with the PSA, they will overly soften the PSA reducing adhesion and, especially, shear resistance. If the plasticizer is not compatible with the PSA, then the plasticizer tends to accumulate at the interface of the PVC backing and the PSA resulting in delamination of one from the other upon aging and exposure to stress. While methods exist to accommodate plasticizer incompatibility, most require costly barrier coatings or expensive tightly specified compounds both of which add to overall product cost.

The thicker tapes are not as stretchy on application and can be applied in a straight line more easily than the thin PVC tapes, although in the case of extruded PVC the extrusion can take on a "set" resulting in curve and/or curl that must be accommodated. While quite rugged, the thicker tapes also present a higher profile to side loads, and as a result need to sustain much higher stresses. The same problem with adhesive degradation from plasticizer compatibility exists with the thicker tapes as with the thinner tapes.

Surveys of end-users of these products to mark industrial workplace floors have uncovered enormous user dissatisfaction with these products. Complaints include difficult and expensive installation, poor resistance to impacts, poor appearance from wear and dirt accumulation, a short useful life, and in the case of the thicker product, very high cost.

SUMMARY OF THE INVENTION

In one embodiment the invention is a floor marking tape having a total thickness of 5-7 mil (0.127-0.178 millimeters, mm) and consisting of:
  A. A top layer consisting of a translucent polyester backing film free of plasticizer and having (i) top and bottom facial surfaces, (ii) a thickness of 3-5 mil (0.076-0.127 mm), (iii) a Shore A Hardness of at least 90, and (iv) a modulus of elasticity of at least 200,000 psi;
  B. A middle layer consisting of a graphic image having top and bottom facial surfaces the top facial surface of which is in direct contact with the bottom facial surface of the polyester backing film; and
  C. A bottom layer consisting of a pressure sensitive adhesive (PSA) having top and bottom facial surfaces the top surface of which is in direct contact with at least one of the bottom facial surface of the backing film and graphic image, the PSA having a (i) thickness of 2-3 mil (0.051-0.076 mm), and (ii) shear resistance of at least 50 hours as measured by PSTC 7 with a one-half inch by one inch sample area.

In one embodiment the bottom facial surface of the backing film is treated, e.g., corona or plasma, or coated with a material so as to promote adhesion of the graphic to the backing film. In one embodiment the graphic image is printed to the untreated bottom surface of the backing film. In one embodiment the graphic image is printed to treated bottom surface of the backing film. In one embodiment the PSA is pigmented. In one embodiment the tape comprises a release liner. In one embodiment the tape is self-wound and comprises a release coating layer above and in direct contact with the backing film. In one embodiment the tape comprises a non-skid coating above and in direct contact with the backing film.

DETAILED DESCRIPTION OF THE PREFERRED EMBODIMENT

Figure 1A:
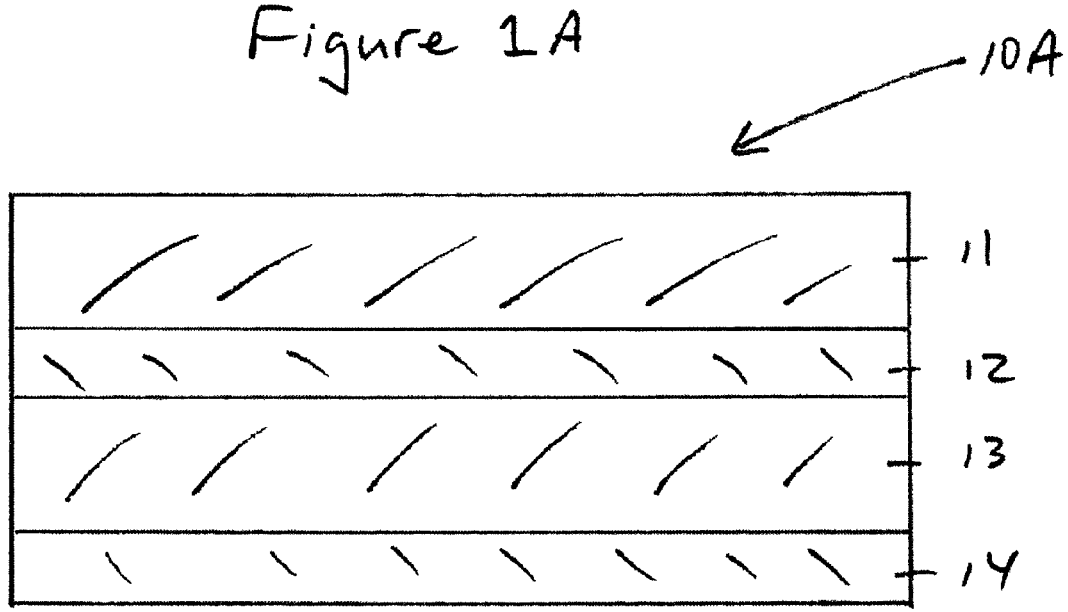
FIG. 1A is a schematic of one embodiment of a floor marking tape of this invention in which the tape comprises a release liner but not a graphic enhancement layer.

"Tape" and similar terms means a long strip of material, typically stored on a roll, comprising a backing layer and an adhesive layer.

"Planar surface", "facial surface", "top surface", "bottom surface" and the like are used in distinction to "edge surface". If rectangular in shape or configuration, a tape will comprise two opposing planar surfaces joined by four edge surfaces (two opposing pairs of edge surfaces, each pair intersecting the other pair at right angles). If circular in configuration, then the tape will comprise two opposing planar surfaces joined by one continuous edge surface. While the tapes of this invention are limited to a defined range of thickness, the planar dimensions of the tape can be of any length and/or width and shape and as such, so can the planar and edge surfaces, e.g., polygonal or circular, flat or wavy, etc. Typically the tape is of conventional planar dimensions, e.g., 1-10 inches, more typically 2-8 inches and even more typically 2-4 inches, in width with a length of 10, 20, 30, 40, 50 or more feet wound and stored in roll form on a cylindrical tube. Top surface and bottom surface are relative terms and in the context of this invention, the bottom surface of a layer is the surface closest to the substrate when the tape is applied to the substrate, e.g., a factory floor, and the top surface of a layer is the surface distal to the substrate when the tape is applied to the substrate.

"Ink" and like terms mean a coatable or printable formulation that can and usually does contain a dye and/or pigment.

"Dye" and like terms mean a visible light absorbing compound that is present in a molecularly dispersed (dissolved) form.

"Pigment" and like terms mean a visible light absorbing material or compound that is present in a non-molecularly dispersed (particulate) form.

"Graphic image" and like terms mean text or pictorial representations formed of ink or other dye or pigments substances. Graphic images include, but are not limited to, words, numbers, bar codes, pictures, designs (geometric or otherwise), and solid colors (typically applied by flood coating).

"Translucent" as used in the context of this invention includes transparent.

The invention is described generally with reference to the drawings for the purpose of illustrating certain embodiments only, and not for the purpose of limiting the scope of the invention. In the drawings like numerals are used to designate like parts throughout the same.

FIG. 1A is a schematic of one embodiment of this invention. Floor marking tape 10A consists of translucent polyester backing film 11 over and in direct contact with graphic layer 12 which, in turn, is over and in direct contact with high shear resistance PSA 13. Optional release liner 14 is under and in direct contact with PSA 13.

Figure 1B:
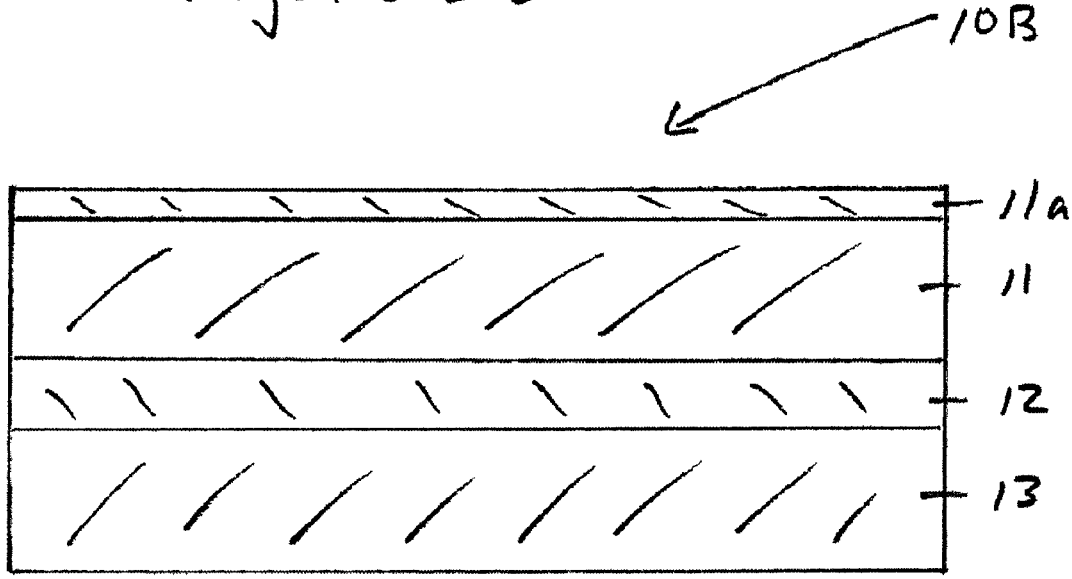
FIG. 1B is a schematic of one embodiment of a floor marking tape of this invention in which the tape is a self-wound tape comprising a release coating layer but neither a release liner nor a graphic enhancement layer.

Tape 10B of FIG. 1B is tape 10A of FIG. 1A in a self-wound format, i.e., release liner 14 is replaced with release coating 11a thus allowing tape 10B to be rolled upon itself. Release coating 11a is over and in direct contact with the top facial surface of backing film 11. The composition of release coating 11a is not important to the practice of this invention, and can vary to convenience. Typically it is a silicone or wax-based material, and is applied at as minimal a thickness as effectively possible, e.g., less than 1 mil, so as not to make any significant contribution to the overall thickness of the tape. In one embodiment, the release coating is easily removed upon application of the tape to a substrate, e.g., a floor, by water or solvent, or through the contact with traffic to which the tape is exposed during normal use.

Figure 1C:
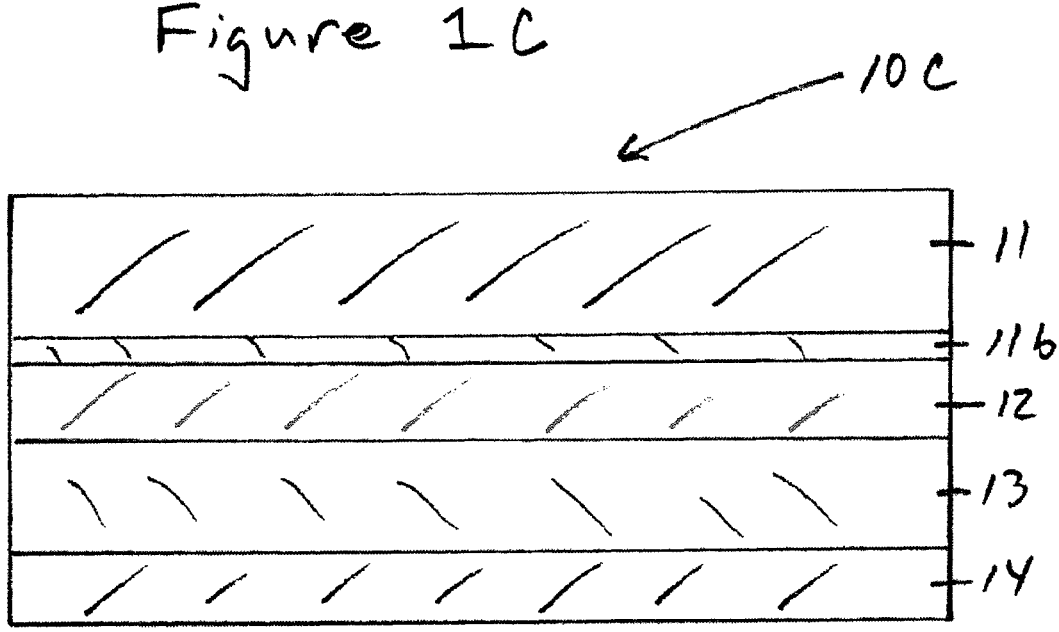
FIG. 1C is a schematic of one embodiment of a floor marking tape of this invention in which the tape comprises both a graphic enhancement layer and a release liner.
Figure 1D:
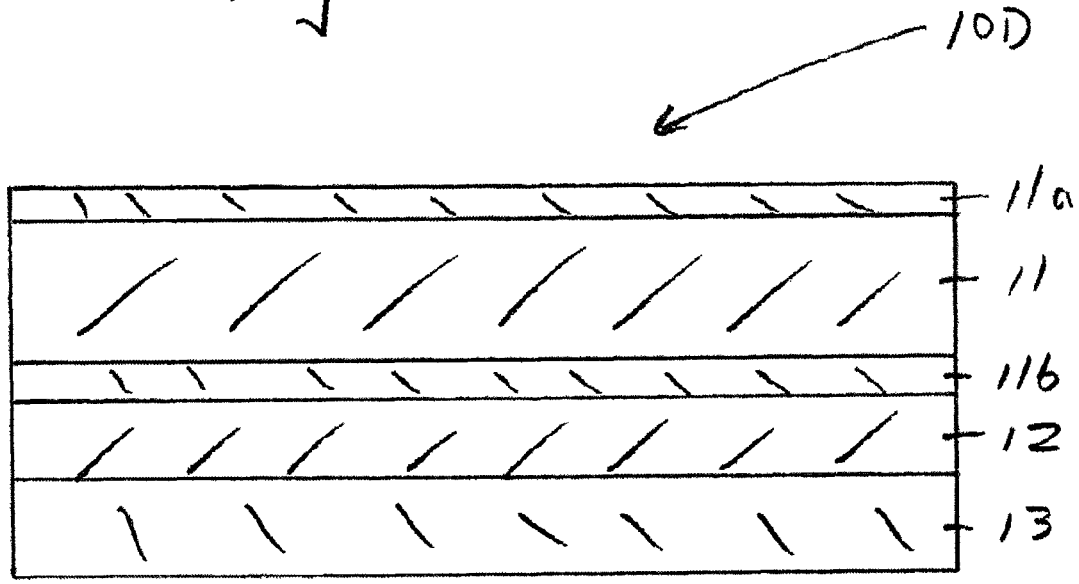
FIG. 1D is a schematic of one embodiment of a floor marking tape of this invention in which the tape comprises both a graphic enhancement layer and a release coating layer but not a release liner.

FIG. 1C is a schematic of one embodiment of this invention in which backing film 11 includes optional coating 11b which is positioned between and in direct contact with the bottom surface of backing film 11 and the top surface of graphic layer 12. Tape 10D of FIG. 1D is tape 10C of FIG. 1C in a self-wound format, i.e., release liner 14 is replaced with release coating 11a.

Figure 1E:
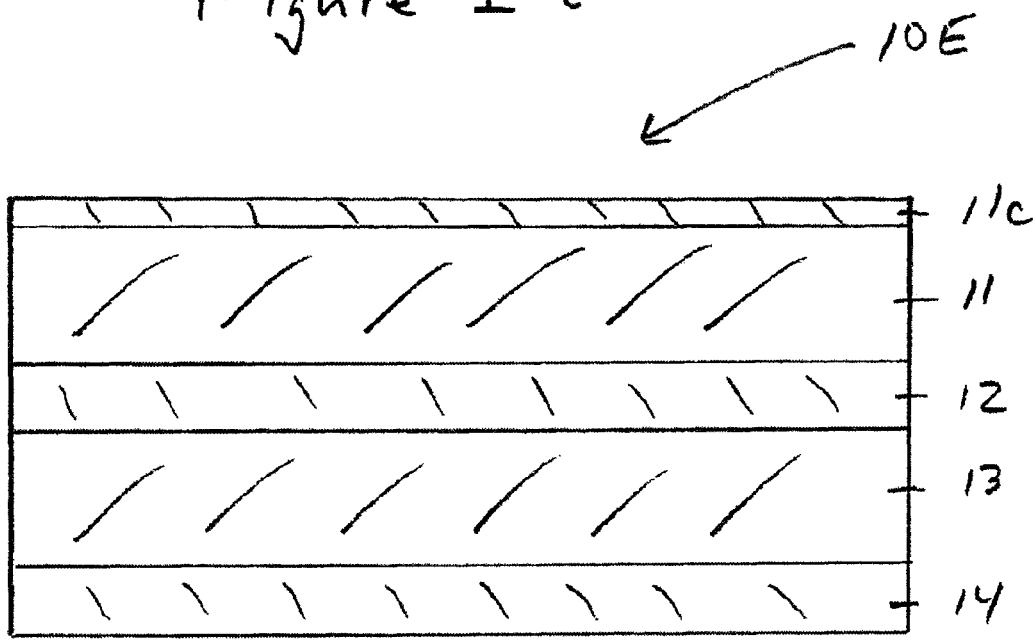
FIG. 1E is a schematic of one embodiment of a floor marking tape of this invention in which the tape comprises both a non-skid coating layer and a release liner, but not a graphic enhancement layer.

Tape 10E of FIG. 1E is tape 10A of FIG. 1A with non-skid coating 11c over and in direct contact with backing film 11. The composition of non-skid coating 11c is not important to the practice of this invention, and can vary to convenience. Typically it is a composition that includes hard particles, e.g., silica or aluminum oxide, dispersed and bound in a polymeric matrix, e.g., polyurethane, acrylate, polyester and the like. The matrix may be crosslinked to improve durability (relative to noncrosslinked matrices, using crosslinkers appropriate to the matrix polymer, e.g., organometallics, isocyanates, melamines and the like. Alternatively, the polymeric matrix can be formed through the photo-initiated crosslinking of oligomers, e.g., acrylates, urethanes and the like. The composition is applied at as minimal a thickness as effectively possible, e.g., less than 1 mil, so as not to make any significant contribution to the overall thickness of the tape.

Figure 1F:
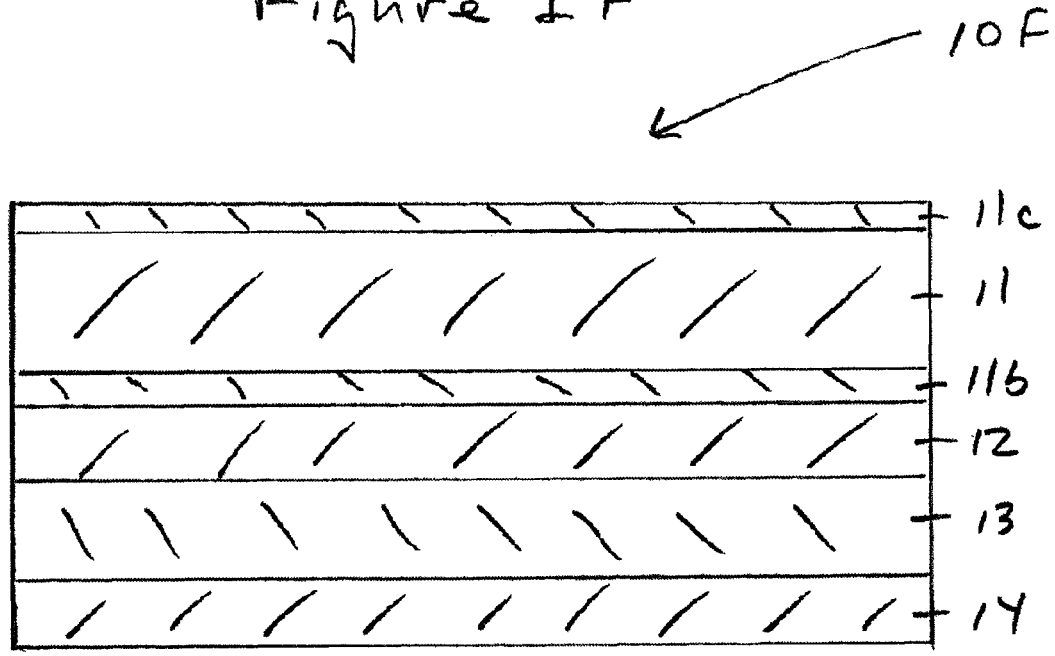
FIG. 1F is a schematic of one embodiment of a floor marking tape of this invention in which the tape comprises a non-skid coating layer, a graphic enhancement layer and a release liner.

Tape 10F of FIG. 1F is tape 10C of FIG. 1C with non-skid coating 11c over and in direct contact with backing film 11.

Backing film 11 is free of plasticizer and can comprise any unplasticized film (i.e., film free of plasticizer) of sufficiently high hardness and modulus of elasticity, e.g., polyester, polycarbonate, polyacrylate, polyimide and the like. In one embodiment, the backing film is any film that exhibits a Shore A Hardness of at least 90, preferably of at least 92 and more preferably of at least 94 as measured by ASTM D2240-05, and a modulus of elasticity of at least 200,000, preferably at least 300,000, more preferably at least 500,000 and even more preferably at least 600,000, psi as measured by ASTM-D882-02 Modulus. On the Shore D Hardness scale (also measured by ASTM D2240-05) the hardness of the polyester is between 40 and 90. The film of choice is polyester, especially polyethylene terephthalate (PET). The absence of plasticizer, such as that present in many, if not most, PVC films, eliminates plasticizer migration and the problems associated with it. The backing film, with or without any facial surface treatment or coating is sufficiently translucent to allow ready discernment of any printed or otherwise applied graphic to either backing film 11 and/or coating 11a.

Backing film 11 may be coated on one or both facial surfaces. If coated on the bottom facial surface, i.e., the facial surface opposite the printed graphic layer, then the purpose is usually to promote adhesion of the graphic to the backing film. Promoting materials (primers) include a broad range of polymer-based coatings (thermoplastic polyesters, acrylates, vinyl (e.g., polyvinyl chloride), vinylidene chloride, urethanes, epoxies and the like, typically compounded with various adhesion promoting additives such as silanes, silicas, titanates and various crosslinkers (organometallics, isocyanates, melamines, and the like). Two examples of such adhesion promoters are Adcote 1217D available from The Dow Chemical Company, and Vitel 2100B available from Bostik Findley.

Typically these coatings, if present, are applied by the manufacturer of the film but can otherwise be applied by any conventional technology, e.g., flood coating, printing, etc. These optional coatings are typically very thin, e.g., 10 microns or less, and typically, but not necessarily, cover the complete bottom facial surface of the backing film. The thickness of the backing film, with or without one or more coatings, is 3-5 mils (0.076-0.127 millimeters, mm).

Alternatively, the backing film may be surface treated to enhance its receptivity to the ink or other colorant of the graphic image. Print adhesion treatments for polyester film are well known, and various methods exist to affect this including mechanical and/or chemical abrasion, flame and corona. Surface treatment of the backing film does not add to its thickness.

Graphic image 12 can be applied in any manner using any ink or colorant that will make the graphic image visible and understandable to a person viewing it through the translucent backing film. Typically the graphic image is printed to the bottom facial surface of the backing film or coating (if one is present), i.e., it is subsurface printed such that the graphic image is sandwiched between the bottom facial surface of either the backing film or optional coating and the top facial surface of the PSA, and thus protected from the environment in which the tape is used. The graphic image can be applied to the facial surface of the backing film or coating such that it completely covers the bottom surface, e.g., a solid color from edge to edge, or only a portion of the facial surface, e.g., text, barcode, geometric shape, logo, etc.

For flexographic printing UV-curable inks are preferred of which SERICOL SP 850 available from Fujifilm Sericol USA, Inc. and Kolorcure 5800 available from Kolorcure Corporation are representative. The subsurface color can be applied by other means as well, such as gravure, screen and inkjet printing. The inks may be of any color and because the color imparted to the tape is sourced in the ink, a much larger palette of colors is available. The range of colors imparted by pigmenting or dying the backing film and/or PSA is much more limited in choice not only because of their limited compatibility with many of the commercially available pigments and dyes, but also because of the cost of manufacturing low volumes. Films and adhesives are generally coated on large, wide-web coating machines. The setup and cleanup cost are considerable.

In contrast, inks can be printed on narrow web presses designed for quick change over, so the economics of printing the color required is favorable when small lot sizes and/or low inventory levels of the variety of colors required. Moreover, inks have a much wider compatibility with a wider variety of colorants. Thus imparting color to the tape at the printing stage enables the use of a range of colors not otherwise readily available for such a purpose. The thickness of the graphic image is, like the thickness of the optional coating to the backing film, a negligible contributor to the overall thickness of the tape, typically contributing less than 10 microns to the thickness of the tape.

Any PSA that has shear resistance of at least 50, preferably at least 100 and more preferably at least 200, hours as measured by Pressure Sensitive Tape Council (PSTC) 7 with a sample area of one-half by one inch can be used in the practice of this invention. In one embodiment the PSA is a block copolymer in which one of the blocks is "hard", e.g., has a softening temperature of at least 85° C., more typically a softening temperature of at least 90° C. and even more typically a softening temperature of at least 92° C., such as a styrenic block. In one embodiment the softening temperature of the hard block of the copolymer is lower than 85° C. but the copolymer is crosslinked to impart the desired shear resistance. Representative PSA include but are not limited to rubber-based materials such as MORSTIK 123 and 190 both from The Dow Chemical Company, and DUROTAK R6202 available from National Starch, and acrylic-based materials such as AROSET 1860 available from Ashland and GELVA 1753 available from The Dow Chemical Company.

The PSA is typically pigmented to provide an appropriate background, e.g., level of contrast, for the graphic image. Any pigment that is sufficiently compatible with the PSA can be used, and typically it is white, e.g., titanium dioxide. The pigment can be mixed with the PSA using any conventional technology. "Sufficiently compatible" means that the blended PSA and pigment has the desired opacity and background color (white being preferred) without reducing adhesion (either shear or peel) to a level that causes performance problems (resistance to scrape or twist) in use. The PSA or bottom layer of the tape (the optional release liner excluded), and with or without pigment, has a thickness of 2-3 mil (0.051-0.076 mm).

The top facial surface of the PSA is in direct contact with the bottom facial surface of the graphic image. Of course, if the graphic image does not cover the entire bottom facial surface of the backing film or coating (if a coating is present), then the top facial surface of the PSA will be in direct contact with parts of both of the bottom facial surface of the graphic image and backing film (or coating).

The construction of optional release liner 14 is not particularly important to the practice of this invention and its purpose, of course, is to protect the PSA until the label is ready for application to an object, e.g., the floor of a commercial building. Examples of materials that can be used for the liner include glassine paper, laminated paper, polyester film and polypropylene film, preferably each of which has been subjected to a coating of silicone. In one embodiment the tape is without a release liner. In this embodiment the release liner is replaced with a release coating, e.g., silicone-based, applied to and in direct contact with the top facial surface of the tape.

The tapes of this invention are constructed in any convenient manner. In one embodiment, an opaque, white transfer adhesive is compounded and coated at 32 pounds per ream with pigmented MORSTIK 123 PSA. Pigment is obtained in a pre-dispersed paste form which is easily mixed into the adhesive to obtain the desired whiteness and opacity. This mix is then cast to a differential release liner (two-sided, release-coated film or paper liner to enable self-winding of the transfer adhesive) on a coater, dried and rewound into a wide roll. The transfer adhesive is slit to an appropriate width for final converting (printing, die cutting, slitting).

The translucent backing film is subsurface printed with graphics (in reverse) and/or flood coated with a UV-curable ink on a flexographic printing press. Typically, at least two flood coat print stations are utilized to gain satisfactory opacity, even coverage, and allow for good UV-cure of each layer. If a graphic such as a diagonal stripe is required, then it is applied at a third station (positioned ahead of the flood coating stations). These multiple printing and/or flood coat stations produce a single layer of graphic image. Adequate cure and good adhesion of these ink layers contribute to the integrity of the laminate structure. In this same process, after printing, the transfer adhesive is laminated to the ink and/or backing film layer and the tape is slit to a finished width (typically 2 inches) and rewound.

Although the invention has been described in considerable detail by the preceding examples and references to the drawings, this detail is for the purpose of illustration and is not to be construed as a limitation upon the spirit and scope of the invention as it is described in the appended claims. All patents and publications cited above, specifically including for U.S. practice all U.S. patents, allowed patent applications and U.S. patent application Publications, are incorporated herein by reference.

What is claimed is:

1. A floor marking tape having a total thickness of 5-7 mil (0.127-0.178 millimeters, mm) and consisting of:
   A. A top layer consisting of a translucent polyester backing film free of plasticizer and having (i) top and bottom facial surfaces, (ii) a thickness of 3-5 mil (0.076-0.127 mm), (iii) a Shore A Hardness of at least 90, and (iv) a modulus of elasticity of at least 200,000 psi;
   B. A middle layer consisting of a graphic image having top and bottom facial surfaces the top facial surface of which is in direct contact with the bottom facial surface of the polyester backing film;
   C. A bottom layer consisting of a pressure sensitive adhesive (PSA) having top and bottom facial surfaces the top surface of which is in direct contact with at least one of the bottom facial surface of the backing film and graphic image, the PSA having a (i) thickness of 2-3 mil (0.051-0.076 mm), and (ii) shear resistance of at least 50 hours as measured by PSTC 7 with a one-half inch by one inch sample area; and
   D. An optional release liner under and in direct contact with the bottom layer.

2. The tape of claim 1 in which the release liner is present.

3. The tape of claim 2 in which the polyester backing film comprises polyethylene terephthalate.

4. The tape of claim 3 in which the PSA comprises a block copolymer in which the softening temperature of the hard block is at least 85° C.

5. The tape of claim 4 in which the hard block is styrene.

6. The tape of claim 5 in which the PSA is pigmented.

7. The tape of claim 6 in which the pigment is titanium dioxide.

8. The tape of claim 7 in which the graphic image comprises a UV-curable ink.

* * * * *